(No Model.) 3 Sheets—Sheet 2.

E. G. N. SALENIUS.
CENTRIFUGAL BUTTER EXTRACTOR.

No. 509,185. Patented Nov. 21, 1893.

Witnesses:
John J. Rennie
J. H. Caplinger

Inventor:
Erik G. N. Salenius.
By Henry Connett
atty.

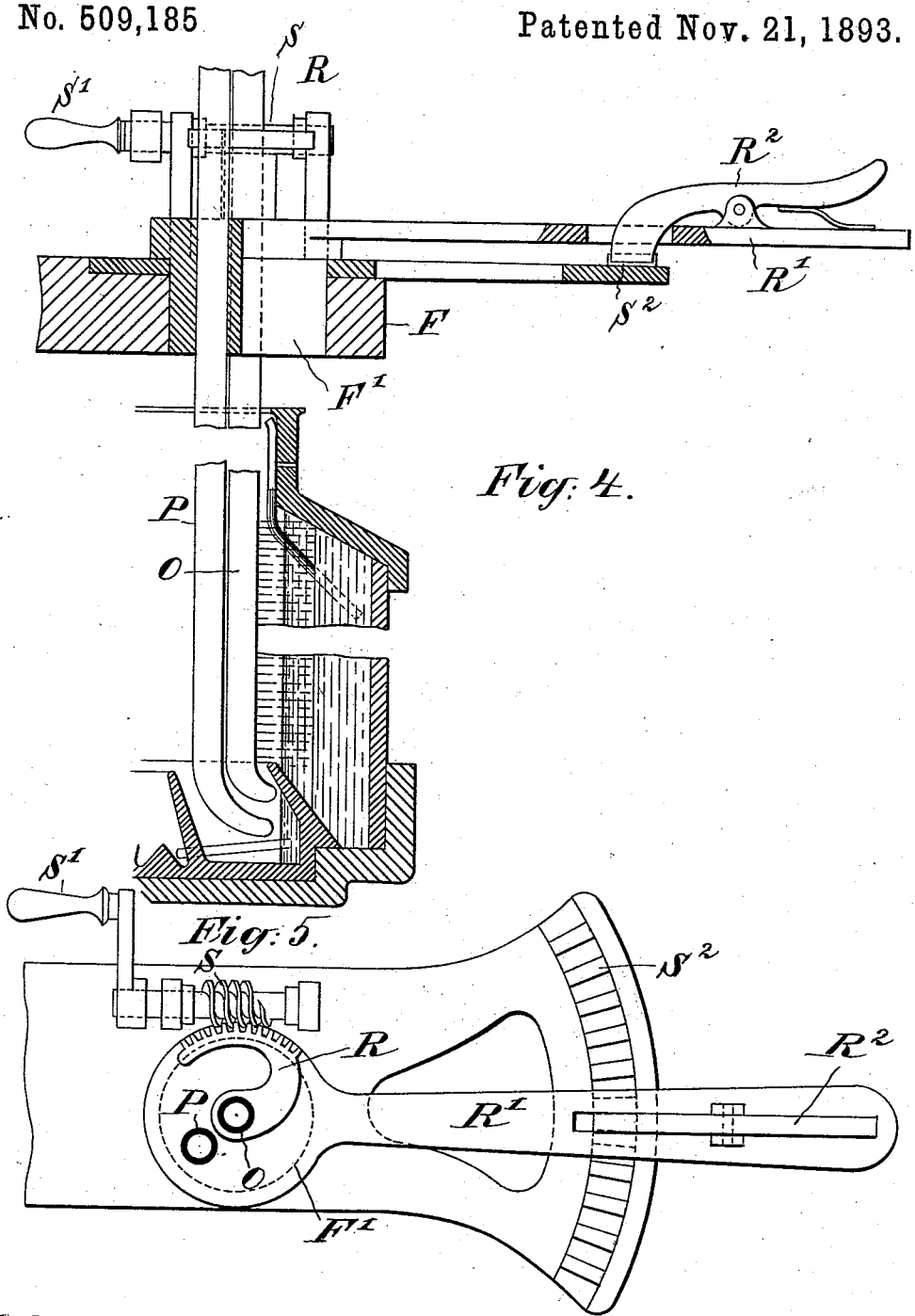

UNITED STATES PATENT OFFICE.

ERIK GUSTAF NICOLAUS SALENIUS, OF LOFHOLMEN, ASSIGNOR TO THE AKTIEBOLAGET RADIATOR, OF STOCKHOLM, SWEDEN.

CENTRIFUGAL BUTTER-EXTRACTOR.

SPECIFICATION forming part of Letters Patent No. 509,185, dated November 21, 1893.

Application filed March 26, 1891. Serial No. 386,560. (No model.)

*To all whom it may concern:*

Be it known that I, ERIK GUSTAF NICOLAUS SALENIUS, a subject of the King of Sweden and Norway, residing at Lofholmen, Liljeholmen, Sweden, have invented certain Improvements in an Apparatus for the Separation of Butter-Fat from Milk, of which the following is a specification.

My invention relates to improvements in that class of apparatuses employed for the separation of the butter fat from the cream, milk, &c., in which it is suspended, in a continuous manner, of which the machine illustrated and claimed in my United States Letters Patent, No. 448,373, dated March 17, 1891, is a type. In this class of machines, the milk or cream is fed in a continuous stream into the rapidly revolving drum of the apparatus, forming a cream wall under the action of the centrifugal force, against which cream wall is forced a series of jets or tiny streams of blue milk or other suitable fluid, whereby said cream wall is beaten or whipped up and the particles of butter caused to coalesce, forming an inner wall of butter fat which rises as it is formed until it at last passes up out of the revolving drum and is deposited in a receiver arranged to receive it.

My invention will be hereinafter fully described and its novel features carefully defined in the claims.

In order that my invention may be the better understood I have illustrated in the accompanying drawings several forms of the apparatus, differing slightly in construction, but not as regards the material features of my present invention, in which drawings—

Figure 1:
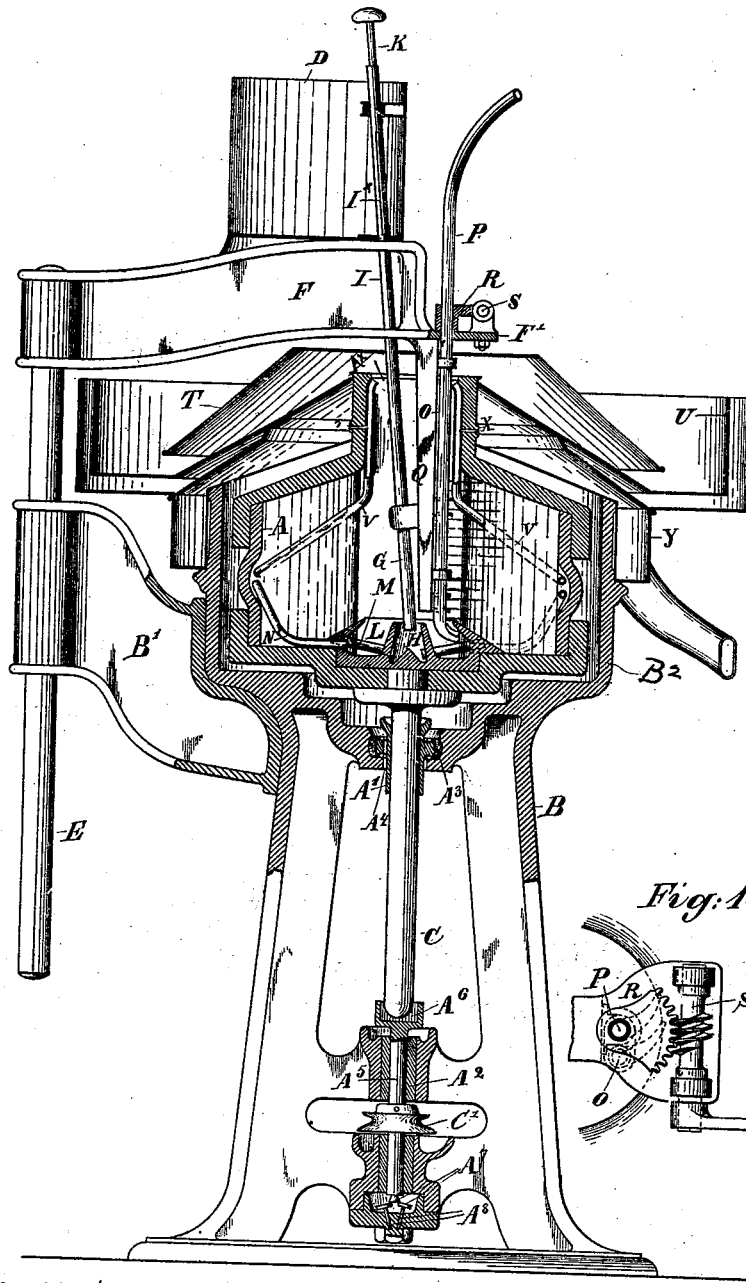
Figure 2:
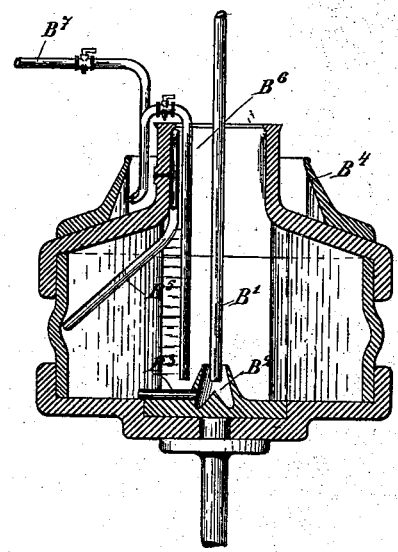
Figure 3:
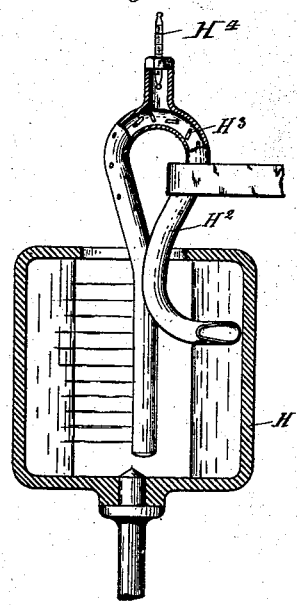

Figure 1 is a vertical mid-section of an apparatus constructed according to my invention, and Fig. 1$^a$ is a detail view which I will hereinafter describe. Figs. 2 and 3 are views of the upper portion of the apparatus, similar to the upper part of Fig. 1, but differing slightly therefrom in construction. Figs. 4 and 5, are respectively, a vertical section and plan view on an enlarged scale showing details of construction to be hereinafter described.

Referring to Fig. 1, A is the inner, rotating drum of the machine, which is mounted on the upper end of the upright shaft C, supported in bearings at $A^2$ and $A^3$, in the upright frame B and provided with a pulley $C'$, to receive a belt for driving. The frame B carries at its upper part an inclosing drum or casing $B^2$, surrounding the drum A and serving to house and protect the latter. In a bracket $B'$, is set an upright spindle E, which supports on an arm F on its upper end, the cream or milk reservoir D. From this reservoir a pipe I extends down within the drum A, the lower end thereof opening into a central chamber H formed in the base of drum A. Surrounding said chamber H is an annular chamber L and chamber H communicates with the interior of drum A horizontally through tubes M, which pass across chamber L and open from the outer walls thereof. Tubes N communicate between chamber L and the outer portion of chamber A, and tubes O and P serve to draw off the blue milk from chamber L, being curved at their lower ends where they enter the same, as clearly seen in the drawings, and being adapted to scoop or draw the blue milk in at their mouths and carry it upward under the centrifugal pressure. The unskimmed milk or cream is fed from reservoir D, through tube I and enters chamber H from which it is thrown outward under the centrifugal force, through tubes M, entering chamber A. In this chamber the rapid motion soon forms a vertical cream wall on the inner surface of the revolving volume of milk. The tube P is mounted rotatively on a downward projection of bracket F, and said tube is provided at its upper end with a sector shaped rack R, which meshes with a worm S mounted in bearings on an extension of bracket F, and provided with a crank whereby it may be rotated for swinging the lower curved mouth of tube P into or out of the rotating volume of milk in chamber L, so as to regulate the quantity of skimmed milk withdrawn from the apparatus according to the requirements of working.

The adjustment of tube O is effected through that of the tube P, both tubes being secured and moving together, but it is evident that they may be provided with independent means of adjustment, in which case the means illustrated in Fig. 1ª for both tubes may be duplicated for each tube; or in lieu of this duplication, the arrangement shown in Figs. 4 and 5 may be employed. In this construction the tube P is mounted in a collar centered on tube O, which collar has a projecting operating arm R', playing over a curved rack S² mounted on the frame and provided with a spring finger R² engaging said rack, whereby when adjusted the tube may be fixed in position by the engagement of said finger with rack S². The tube O is mounted on a worm segment R, meshing with a worm S mounted on the frame and provided with a crank S', for operating it, similar to that device seen in Fig. 1ª.

During the operation of the machine, the milk being fed in a continuous stream through tube I, a vertical cream wall is formed on the inner surface of the revolving volume of liquid in drum A, and as this volume increases owing to the continuous feed through tube I, the circumference of said wall lessens until it corresponds substantially, to the circumference of the neck $A^\times$ of drum A, when the tubes O and P come into action as I will now describe. The circumference of the cream wall having approached nearly to the circumference of the neck of drum A, the circumference of the volume of liquid in chamber L will, of course, be substantially equal thereto, but only blue milk can find its way into said chamber it being open through the tubes N, N, to the outer part of chamber A only, as before stated. The skimming tubes O and P will now commence to draw up the blue or skimmed milk from chamber L, by reason of the curve given to their mouths, the milk drawn up by tube O being sprayed outward, forcibly, against the cream wall of the mass in drum A, through a series of minute jet apertures therein, as will be readily understood, and said tube being closed at its upper end, the force of such spray will be considerably augmented. The milk drawn up by skimming tube P will be carried out of the machine, this tube forming the main outlet for the blue or skimmed milk, as will be readily understood. The action of the spray or jets of blue milk thrown from skimming tube O against the cream wall will be to whip or beat the particles of butter fat in said wall, together, causing them to coalesce and form a wall of pure butter fat, which becoming lighter than the cream, forms within the same and rises in the course of the operation passing entirely up out of the neck $A^\times$ being forcibly thrown therefrom by the centrifugal force.

In order to collect the butter as it is thrown from the machine, I prefer to provide a conical hood T of sheet metal, inclosing the mouth thereof, the downwardly directed periphery of said hood serving to direct and guide the newly formed butter into the butter receiver U, as clearly shown, and I also prefer to provide said receiver with double walls, between which some cooling medium may be placed as cracked ice, to prevent the newly formed butter from souring as it is quite likely to do before being salted and worked.

In order to provide against a sudden increase in the column of liquid in drum A, which might be too great to be carried away by the tube P, I have provided auxiliary outlet tubes V, V, which lead from the outer walls of chamber A where the blue milk from which substantially all of the cream has been separated lies, and are bent upward into the neck $A^\times$ of drum A. About midway up the neck apertures X, X open from tubes V, into a sheet metal receiver Y, outside. In this way any sudden rise in volume in drum A will force the blue milk up through tubes V and out through openings X into the blue milk receiver Y, outside the apparatus.

In order to regulate the supply of milk to the apparatus, that part of tube I which opens into reservoir D is slitted and said tube is provided with a plug valve K, adapted to be pressed into or withdrawn therefrom by means of a handle, whereby said slit $I^\times$ may be wholly or partially closed at will.

The bearing $A^3$ is apertured or provided with slits $A^4$, whereby any grease or liquid which may drop thereon may pass down and be wiped off.

$A^6$ is a wooden block set in the cup like recessed end of shaft $A^5$, and in this block rests the rounded end of shaft C. The lower end of shaft $A^5$ is stepped on two inclined spindles or rollers $A^7$, the stems $A^8$ of which are set in the solid frame work of the apparatus. Thus it will be seen that said shaft is supported on the inclined inner edges of the disks $A^7$ at all times, and rotation of said shaft rotates said disks in opposite directions thereby reducing the friction and wear to a minimum.

In the construction seen in Fig. 2, the operation is the same as in that illustrated in Fig. 1, the construction only being changed by the omission of chamber L together with tubes O and P from within drum A and the employment in lieu thereof of a chamber $B^4$ outside the drum, communicating and drawing blue milk therefrom through a pipe $B^5$ corresponding to both tubes N and V of the former construction. The chamber $B^4$ also corresponds to receiver Y, but is rotative, and two pipes $B^6$ and $B^7$ provided with bent lower ends or mouths, dip into the blue milk contained therein. The tube $B^6$ corresponds with tube O and is bent downward into drum A and provided with jet apertures and a closed lower end after the same fashion, while tube $B^7$ corresponds with tube P and serves to convey the blue milk away from the apparatus.

The construction seen in Fig. 3 is more particularly adapted for working the process on a small scale than for continuous working. In this case the drum H' is supplied with the proper quantity of cream for a working and being set in rapid rotary motion the tube H² scoops out a certain part of the heavier liquid which is carried through said tube and forced against the cream wall at the opposite side of the drum, stirring or beating the cream in the same manner as before described. In order that the whole or substantially the whole volume of liquid in drum H' may pass through this skimming pipe in a comparatively short time, it is well to provide a pipe of large diameter and in order that said tube may disturb the cream wall as little as possible after it shall have formed, I prefer to form the mouth of said pipe as illustrated, that is, tapering in cross section toward the center of the drum. In order to further stir or beat up the liquid in its passage through tube H² I prefer to provide a series of pins H³ projecting into the interior of said tube, and I have shown said tube provided with a thermometer H⁴ in order that the temperature may be conveniently taken. It is evident that in both these constructions the principle of operation is the same as in the construction seen in Fig. 1, the milk being separated first into cream and blue milk, forming a cream wall under the centrifugal action and the blue milk being forced into the mouth of a skimming pipe and projected from jet apertures therein against the said cream wall.

In the construction seen in Fig. 3, but one chamber is employed in lieu of chambers A and L of Fig. 1, but it is evident that during the operation this single chamber performs the functions of two separate and distinct chambers, the formation of the cream wall on the inner face of the revolving volume leaving a space between and next the wall of chamber A corresponding to the blue milk chamber; also in the construction shown in Fig. 3, I have shown the skimming pipe provided with studs or projections serving to stir or whip the liquid in its passage therethrough, and it is evident that these studs may be provided in the skimming pipes seen in Figs. 1 and 2.

Having thus described my invention, I claim—

1. In an apparatus for separating butter fat from milk, the combination with a rotating drum, of a stationary skimming pipe not rotating with the drum but arranged mainly within the same, said skimming pipe having its receiving end situated near the wall of the drum and turned in a direction opposite to that in which the drum is rotating, and the other extremity of the said skimming pipe being pendent in the drum, closed at the end and provided with jet apertures in its wall adapted to spray the blue milk taken in at its mouth against the cream wall within the drum, substantially as set forth.

2. In an apparatus for separating butter fat from milk, the combination with a rotating drum provided with cream and blue milk chambers or compartments, of the two skimming pipes arranged with their mouths entering said blue milk compartment, one of said pipes closed at one end and provided with one or more jet apertures in its wall, and the other leading out of the apparatus, whereby as the drum rotates one of said pipes serves to spray the blue milk against the cream wall while the other serves as an outlet for the blue milk substantially as and for the purposes set forth.

3. In an apparatus for separating fat from milk, the combination with a rotating separator drum, of a stationary skimming pipe having its receiving end within the drum so situated as to receive the blue milk as the drum rotates, and having its other end closed and provided with lateral jet apertures in its wall from which the milk is sprayed against the cream wall within the drum, said pipe being furnished interiorly with studs or projections arranged in the path of the liquid which flows through it, substantially as set forth.

4. In an apparatus for separating butter fat from milk, the combination with a rotating drum provided with the chamber L, of the tubes for supplying blue milk thereto from the interior of said drum, and the skimming pipe O, arranged with its mouth entering chamber L and provided with a series of jet apertures in its wall, whereby as the drum rotates blue milk is sprayed from said tube against the cream wall formed in said drum.

5. In an apparatus for separating butter fat from milk, the combination with the rotating drum, provided with the chamber L, of the tubes for supplying blue milk thereto from the interior of said drum, and the skimming pipes O and P arranged with their mouths entering chamber L, said pipe O provided with a series of jet apertures in its wall, and said tube P leading out of the apparatus, whereby as the drum rotates blue milk is sprayed from said tube O against the cream wall in said drum.

6. In an apparatus for separating butter fat from milk, the combination with the rotating drum, of the chamber L, and the tubes communicating between said chamber and the interior of said drum, of two skimming pipes arranged with their mouths entering said chamber L, one of said pipes provided with one or more jet apertures in its wall, and the other leading out of the apparatus, whereby as the drum rotates blue milk is sprayed from one of said tubes, while the other serves as an outlet for the apparatus, of the auxiliary tubes V leading from the interior of said rotating drum out of the apparatus, whereby any excessive feed of milk is led off, as set forth.

7. In an apparatus for separating butter fat from milk, the combination with the rotating drum, of the chamber L, and the tubes communicating between said chamber and the interior of said drum, of two skimming pipes arranged with their mouths entering chamber L, one of said pipes provided with one or more jet apertures in its wall and the other leading out of the apparatus, whereby as the drum rotates blue milk is sprayed from one of said tubes while the other serves as an outlet for the apparatus, of the auxiliary tube V leading from the interior of the rotating drum out through the neck thereof, and the coinciding apertures in the side walls of said neck and tube, whereby any excessive feed of milk to the apparatus is drawn off, as set forth.

8. In an apparatus for separating butter fat from milk, the combination with the rotating drum provided with the chamber L, of the tubes for supplying the blue milk thereto from the interior of said drum, the skimming pipe O arranged with its mouth entering chamber L, and provided with a series of jet apertures in its wall, and the supply chamber H communicating with the interior of said drum, whereby as the drum rotates blue milk is sprayed from said skimming pipe against the cream wall formed in said drum and the milk supply is drawn from chamber H, as set forth.

9. In an apparatus for separating butter fat from milk, the combination with the rotating drum provided with the chamber L, of the tubes for supplying blue milk thereto from the interior of said drum, the skimming pipes O and P, arranged with their mouths entering said chamber L, said pipe O provided with a series of jet apertures in its wall and tube P, leading out of the apparatus, whereby as the drum rotates blue milk is sprayed from said tube against the cream wall in said drum and means, substantially as described for adjusting tube P into or out of operative position, substantially as and for the purposes set forth.

In witness whereof I have hereunto signed my name in the presence of two subscribing witnesses.

ERIK GUSTAF NICOLAUS SALENIUS.

Witnesses:
NERE A. ELFWING,
ERNST SVANQVIST.